(12) United States Patent
Son

(10) Patent No.: US 11,117,143 B2
(45) Date of Patent: Sep. 14, 2021

(54) CENTRIFUGAL FILTRATION DEVICE

(71) Applicants: Jeong Hwa Son, Busan (KR); Dong Won Son, Busan (KR); CHANG TJER MACHINERY CO., LTD., Taichung (TW)

(72) Inventor: Jeong Hwa Son, Busan (KR)

(73) Assignees: Jeong Hwa Son, Busan (KR); Dong Won Son, Busan (KR); Chang Tjer Machinery Co., Ltd., Taichung (TW)

(*) Notice: Subject to any disclaimer, the term of this patent is extended or adjusted under 35 U.S.C. 154(b) by 129 days.

(21) Appl. No.: 16/550,632

(22) Filed: Aug. 26, 2019

(65) Prior Publication Data

US 2021/0060582 A1    Mar. 4, 2021

(51) Int. Cl.
| | |
|---|---|
| *B01D 45/08* | (2006.01) |
| *B04C 5/103* | (2006.01) |
| *B01D 45/16* | (2006.01) |
| *B04C 5/04* | (2006.01) |
| *F22B 37/26* | (2006.01) |
| *F01K 7/22* | (2006.01) |
| *F22B 37/28* | (2006.01) |
| *F22B 37/30* | (2006.01) |

(52) U.S. Cl.
CPC ............ *B04C 5/103* (2013.01); *B01D 45/08* (2013.01); *B01D 45/16* (2013.01); *B04C 5/04* (2013.01); *F01K 7/22* (2013.01); *F22B 37/26* (2013.01); *F22B 37/28* (2013.01); *F22B 37/30* (2013.01)

(58) Field of Classification Search
CPC .......... B04C 5/103; B04C 5/04; B01D 45/16; B01D 45/08; F01K 7/22; F22B 37/26; F22B 37/28; F22B 37/30
See application file for complete search history.

(56) References Cited

U.S. PATENT DOCUMENTS

| | | | | |
|---|---|---|---|---|
| 3,360,909 A | * | 1/1968 | Barnerias ................ | B04C 3/04 55/348 |
| 3,546,854 A | * | 12/1970 | Muller ................... | B01D 47/00 55/455 |
| 3,590,558 A | * | 7/1971 | Fernandes .............. | B04C 5/103 55/338 |
| 3,885,935 A | * | 5/1975 | Nutter .................... | B04C 3/00 55/457 |
| 3,895,930 A | * | 7/1975 | Campolong ............. | B04C 3/00 55/394 |
| 4,008,059 A | * | 2/1977 | Monson ................. | B01D 45/14 55/396 |
| 4,255,174 A | * | 3/1981 | Simpson ................ | B01D 45/16 55/347 |
| 4,289,611 A | * | 9/1981 | Brockmann ............. | B04C 3/04 209/710 |

(Continued)

*Primary Examiner* — Dung H Bui
(74) *Attorney, Agent, or Firm* — Muncy, Geissler, Olds & Lowe, P.C.

(57) ABSTRACT

A centrifugal filtration device is provided, including: a casing, including an inlet passage and an outlet passage which are arranged on an extension direction; a plurality of blades, extending spirally on an inner circumferential wall of the inlet passage relative to the extension direction; a guiding mechanism, including a first tapering portion tapered in a direction toward the inlet passage, disposed in the casing and located between the plurality of blades and the outlet passage.

9 Claims, 8 Drawing Sheets

(56) References Cited

U.S. PATENT DOCUMENTS

| | | | | |
|---|---|---|---|---|
| 4,311,494 A * | 1/1982 | Conner | B01D 45/16 | 55/394 |
| 4,976,748 A * | 12/1990 | Prinsloo | B04C 3/06 | 95/269 |
| 5,498,273 A * | 3/1996 | Mann | B01D 45/12 | 55/396 |
| 6,540,802 B2 * | 4/2003 | Trautmann | F02M 35/10059 | 55/337 |
| 6,540,917 B1 * | 4/2003 | Rachels | B04C 3/00 | 210/512.1 |
| 6,962,199 B1 * | 11/2005 | Tjeenk Willink | B01D 45/16 | 166/265 |
| 7,258,727 B2 * | 8/2007 | Greif | B01D 45/16 | 55/396 |
| 7,311,744 B2 * | 12/2007 | Elliott | B01D 45/16 | 55/396 |
| 9,022,231 B1 * | 5/2015 | Ford | B04C 9/00 | 210/512.1 |
| 10,036,319 B2 * | 7/2018 | Murray | B01D 45/12 | |
| 2004/0025481 A1 * | 2/2004 | Bugli | B01D 45/16 | 55/392 |
| 2011/0294643 A1 * | 12/2011 | Ford | B04C 5/181 | 494/56 |
| 2012/0103423 A1 * | 5/2012 | Schook | B04C 3/06 | 137/1 |
| 2013/0152525 A1 * | 6/2013 | Brandner | B04C 3/04 | 55/447 |
| 2014/0116255 A1 * | 5/2014 | Perez Guerra | B01D 45/12 | 96/216 |
| 2015/0151231 A1 * | 6/2015 | Loh | B04C 5/13 | 95/271 |
| 2015/0345331 A1 * | 12/2015 | Murray | F01D 25/24 | 415/220 |

\* cited by examiner

CENTRIFUGAL FILTRATION DEVICE

BACKGROUND OF THE INVENTION

Field of the Invention

The present invention relates to a centrifugal filtration device.

Description of the Prior Art

Generally, for separating particles with different sizes or processing particle-containing gas, the particle-containing gas is swirled to separate particles and gas by centrifugal force. Therefore, a conventional filtration device has a cylindrical housing and a guiding mechanism disposed in the housing for swirling the particle-containing gas. The filtration efficiency to the particle-containing gas depends on the structure of the guiding mechanism and its cooperation with the housing. However, the conventional filtration device has a poor configuration of the housing and the guiding mechanism, which results in collision and friction between the particle-containing gas and the filtration device so that the conventional filtration device cannot effectively utilize swirly flow to separate the particles and the gas and has poor filtration efficiency.

The present invention is, therefore, arisen to obviate or at least mitigate the above-mentioned disadvantages.

SUMMARY OF THE INVENTION

The main object of the present invention is to provide a centrifugal filtration device which has high separation efficiency.

To achieve the above and other objects, the present invention provides a centrifugal filtration device, including: a casing, a plurality of blades and a guiding mechanism. The casing includes an inlet passage and an outlet passage which are arranged along an extension direction. The plurality of blades, relative to the extension direction, extend spirally on an inner circumferential wall of the inlet passage. The guiding mechanism includes a first tapering portion tapered in a direction toward the inlet passage. The guiding mechanism is disposed in the casing and located between the plurality of blades and the outlet passage.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
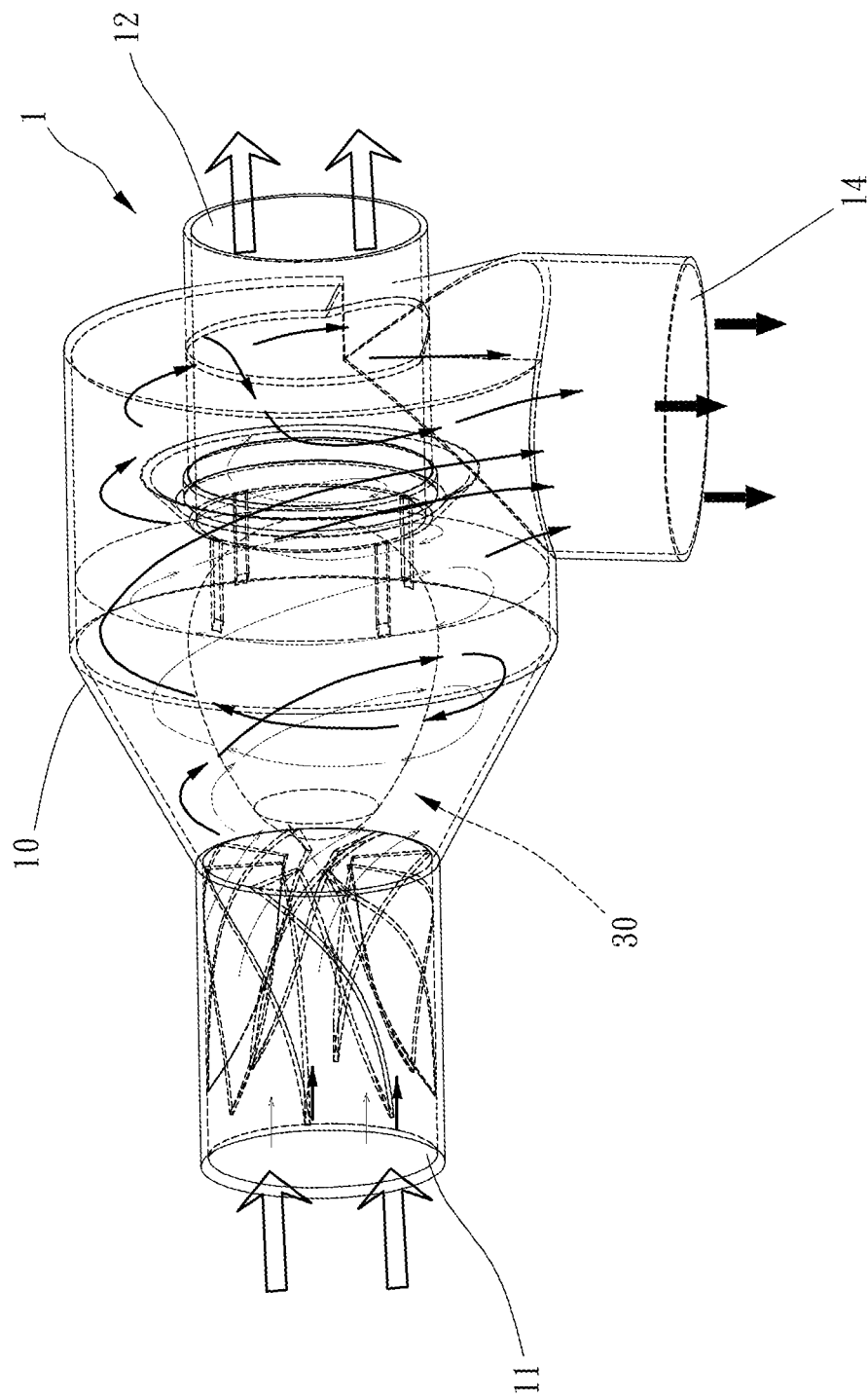
FIG. 1 is a schematic diagram showing operation of a preferable embodiment of the present invention.
Figure 2:
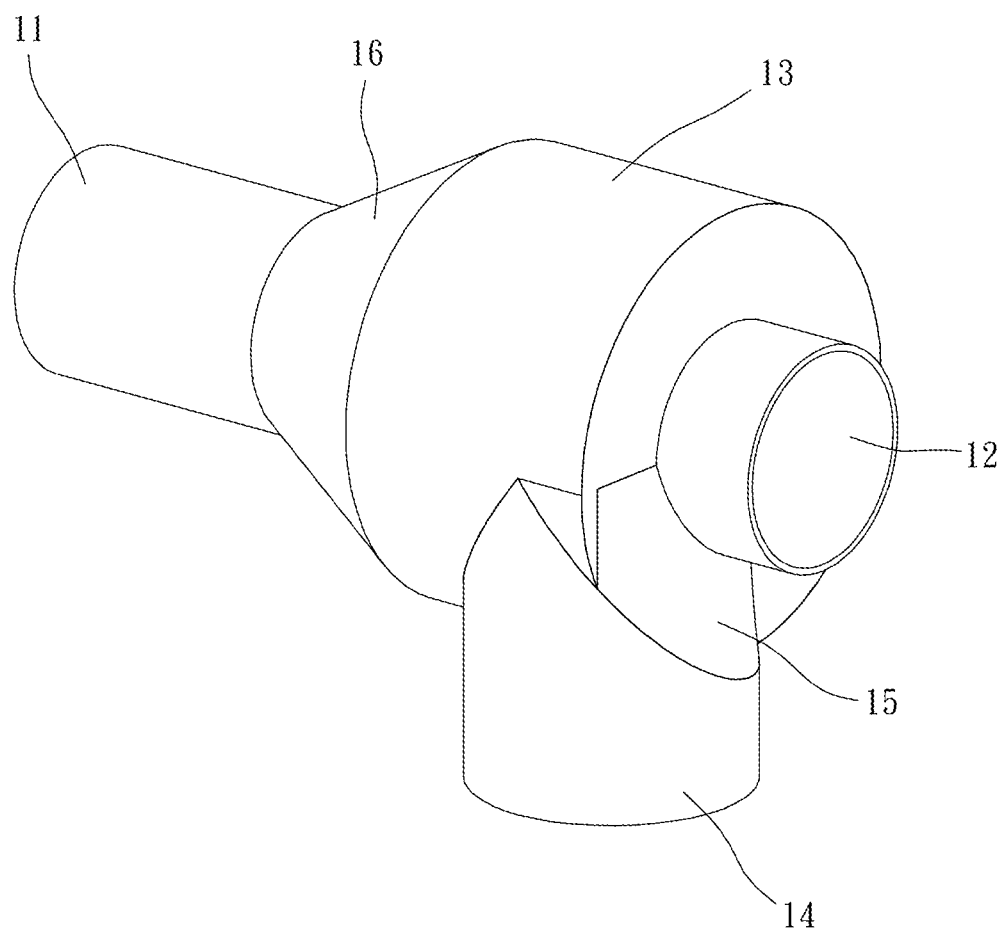
FIG. 2 is a stereogram of a preferable embodiment of the present invention.
Figure 3:
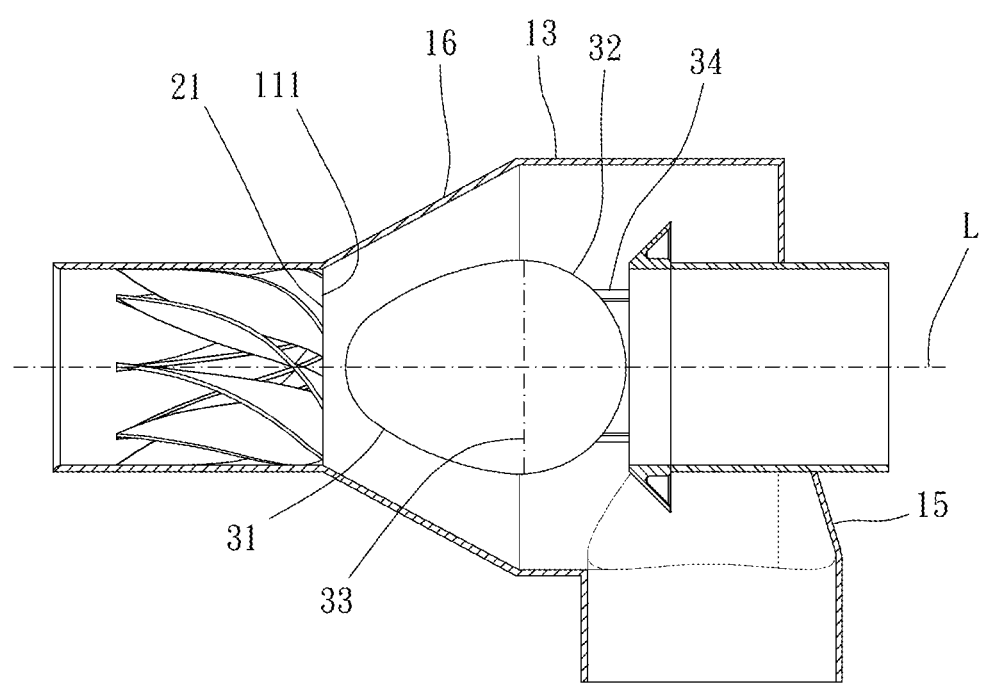
FIG. 3 is a side cross-sectional view of a preferable embodiment of the present invention.
Figure 4:
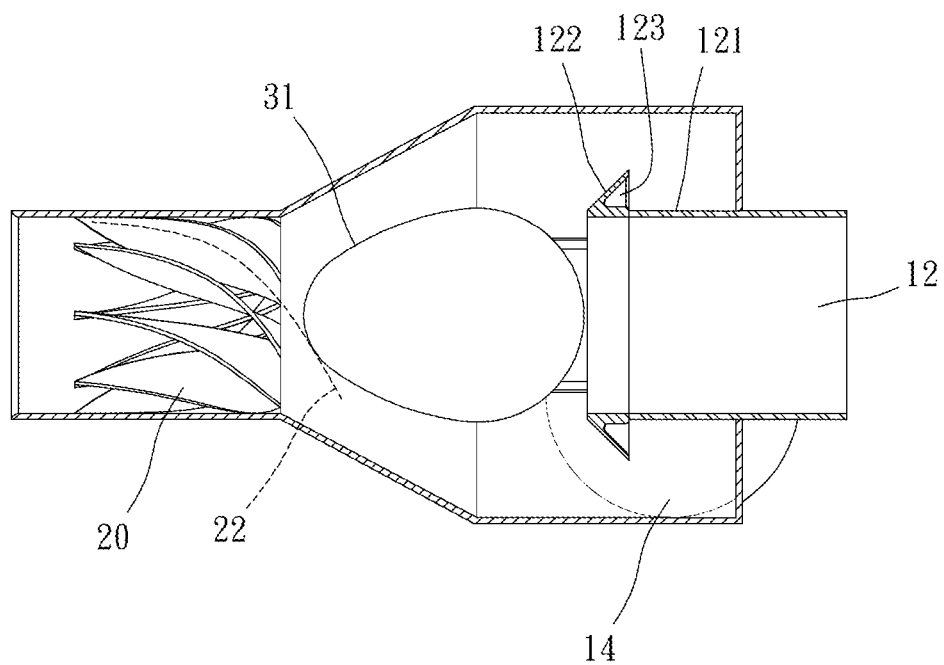
FIG. 4 is a top cross-sectional view of a preferable embodiment of the present invention.

Please refer to FIGS. 1 to 8 for a preferable embodiment of the present invention. A centrifugal filtration device 1 of the present invention includes a casing 10, a plurality of blades 20 and a guiding mechanism 30.

The casing 10 includes an inlet passage 11 and an outlet passage 12 which are arranged along an extension direction L. The plurality of blades 20, relative to the extension direction L, extend spirally on an inner circumferential wall of the inlet passage 11. The guiding mechanism 30 includes a first tapering portion 31 tapered in a direction toward the inlet passage 11. The guiding mechanism 30 is disposed in the casing 10 and located between the plurality of blades 20 and the outlet passage 12. Therefore, the centrifugal filtration device 1 can form swirly flow and has high separation efficiency. Preferably, the casing 10, the inlet passage 11, the outlet passage 12 and the first tapering portion 31 each have a circular cross section so that the centrifugal filtration device 1 has minimal flow resistance and kinetic energy loss.

The guiding mechanism 30 further includes a second tapering portion 32 tapered in a direction toward the outlet passage 12. As viewed in a radial direction perpendicular to the extension direction L, the first tapering portion 31 is non-overlapped with the inlet passage 11 and the second tapering portion 32 is non-overlapped with the outlet passage 12 so as to provide sufficient distance for increasing particle separation efficiency. A distance between an end opening 111 of the inlet passage 11 and the first tapering portion 31 is between 10 mm and 30 mm so as to ensure that particle-containing gas can be swirled and accelerated by the plurality of blades 20 and then passes through the guiding mechanism 30, which avoids accumulation of particles and provides preferable particle separation efficiency. In this embodiment, the guiding mechanism 30 is formed as an oval structure and includes a sharp end and a blunt end which are disposed opposite to each other. The first tapering portion 31 is the sharp end, and the second tapering portion 32 is the blunt end. The sharp end has a small radial cross-section and the oval structure has a smooth outer surface so that it causes a little influence on the swirly flow, and gas can have a tendency to flow along the blunt end because of Coanda effect and can be discharged through the outlet passage 12. A ratio of a major axis to a minor axis of the oval structure is between 1.1 and 1.5, and slopes of respective surfaces of the sharp end and the blunt end and lengths of the major axis and the minor axis may be changed according to various requirements to change path of gas flow. In other embodiments, the first tapering portion and the second tapering portion may respectively be formed as a cone or other geometric cone.

The casing 10 further includes a cylinder portion 13 arranged on the extension direction L and a particle collection passage 14 transversely connected to the cylinder portion 13, and the particle collection passage 14 is located radially out of the outlet passage 12, disposed on the cylinder portion 13 and is off-center in a longitudinal direction of the cylinder portion 13. The particle collection passage 14 at least partially protrudes beyond the cylinder portion 13 toward the extension direction L as viewed in an axial direction of the particle collection passage 14 so that the particles are effectively discharged through the particle collection passage 14 along a direction of inertia. The casing 10 further includes a guiding portion 15 which is obliquely connected between the cylinder portion 13 and the particle collection passage 14 and radially expands outwardly in a direction away from the outlet passage 12, and the guiding portion 15 is located out of the cylinder portion 13 as viewed in the axial direction of the particle collection passage 14. The guiding portion 15 may be an arcuate surface or a plane, and the guiding portion 15 guides the particles located at a periphery of the swirly flow to be discharged through the particle collection passage 14 and prevents the particles from returning to the cylinder portion 13.

The outlet passage 12 includes a tubular member 121 connected to the cylinder portion 13 and a blocking flange 122 disposed circumferentially around the tubular member 121, and at least part of the blocking flange 122 is located within the particle collection passage 14 as viewed in the axial direction of the particle collection passage 14. Therefore, the blocking flange 122 can prevent the particles separated from the gas from flowing backward to the outlet passage 12 via a space between the cylinder portion 13 and the tubular member 121. The blocking flange 122 is gradually radially broadened in a direction toward the outlet passage 12 and includes an annular groove 123 open toward the outlet passage 12 so as to effectively block the particles and discharge the particles through the particle collection passage 14. Preferably, a ratio of an inner diameter of the cylinder portion 13 to a radial dimension of the outlet passage 12 is between 1.5 and 2.5 so that it can provide sufficient swirling space. However, the ratio of the inner diameter of the cylinder portion to the radial dimension of the outlet passage may be configured to be of other values according to structural requirements.

The casing 10 further includes a broadened portion 16 which is connected between the inlet passage 11 and the cylinder portion 13 and is gradually broadened in a direction from the inlet passage 11 toward the outlet passage 12. A maximum diameter portion 33 is defined between the first tapering portion 31 and the second tapering portion 32, and the maximum diameter portion 33 is located in the cylinder portion 13 and adjacent to a junction of the cylinder portion 13 and the broadened portion 16. Therefore, the particles having larger inertia than the gas are swirled outward at the maximum diameter portion 33 along the direction of inertia because of larger centrifugal force and are discharged through the particle collection passage 14, which can prevent the particles from departing from the swirly flow at the broadened portion 16 and have low kinetic energy loss. The guiding mechanism 30 is connected to the outlet passage 12 by at least one supporting member 34. In this embodiment, the centrifugal filtration device 1 includes a plurality of said supporting members 34 so as to improve structural stability without effecting the swirly flow (especially, a peripheral portion of the swirly flow with more particles). However, the guiding mechanism may be connected to an inner wall of the casing by the at least one supporting member.

Figure 5:
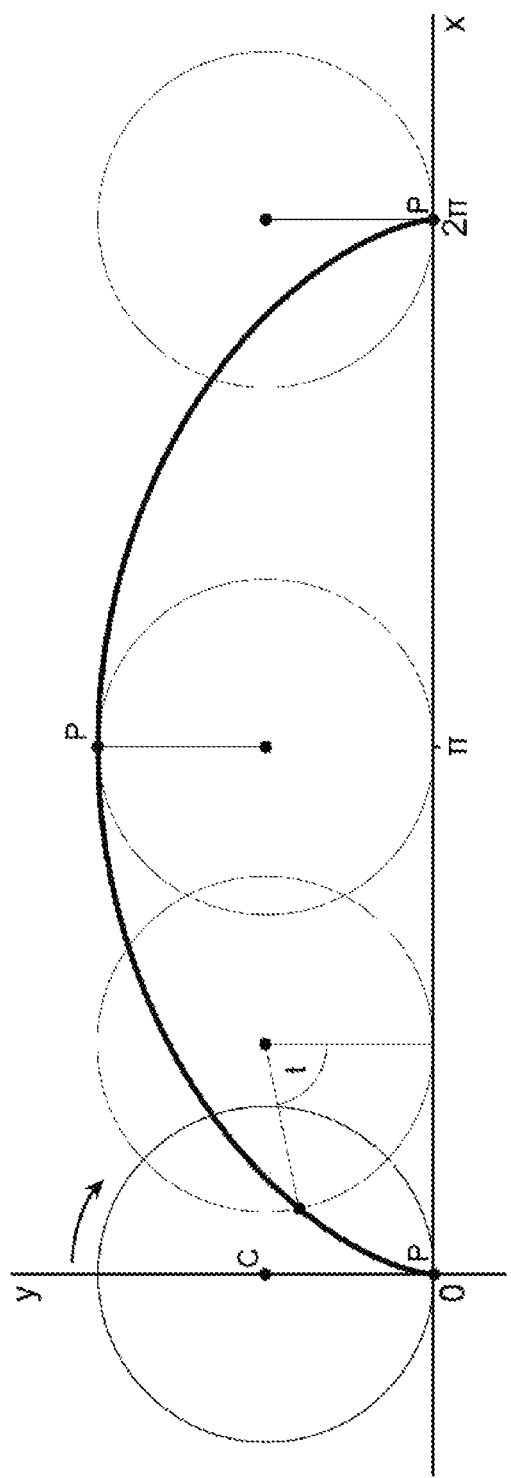
FIG. 5 is a schematic diagram of a two-dimensional cycloidal curve.

Each of the plurality of blades 20 has a side which is adjacent to the first tapering portion 31 and has an end surface 21 flush with an end opening 111 of the inlet passage 11 so as to reduce turbulence and have preferable swirling effect. Preferably, each of the plurality of blades 20 spirally extends along a cycloidal curve C, which provides a shortest path when the particle-containing gas is well-diverted so as to increase the filtration efficiency. A definition of the cycloidal curve is a locus formed by a point P on a circle of radius r rolling without slide on an x-axis (as shown in FIG. 5). The cycloidal curve is expressed as a function of the rotation angle t. When the radius of the circle is r and the rotation angle is t, the function is as shown in the following [Equation 1] and [Equation 2].

$$x = r \times (t - \sin(t)) \quad \text{[Equation 1]}$$

$$y = r \times (1 - \cos(t)) \quad \text{[Equation 2]}$$

To convert a two-dimensional cycloidal curve to a three-dimensional cycloidal curve, a differential function representing a tangential slope of each point on the cycloidal curve is a velocity function based on the cycloidal curve, as shown in following [Equation 3].

$$\frac{dy}{dx} = \frac{\sin(t)}{1 - \cos(t)} \quad \text{[Equation 3]}$$

Figure 6:
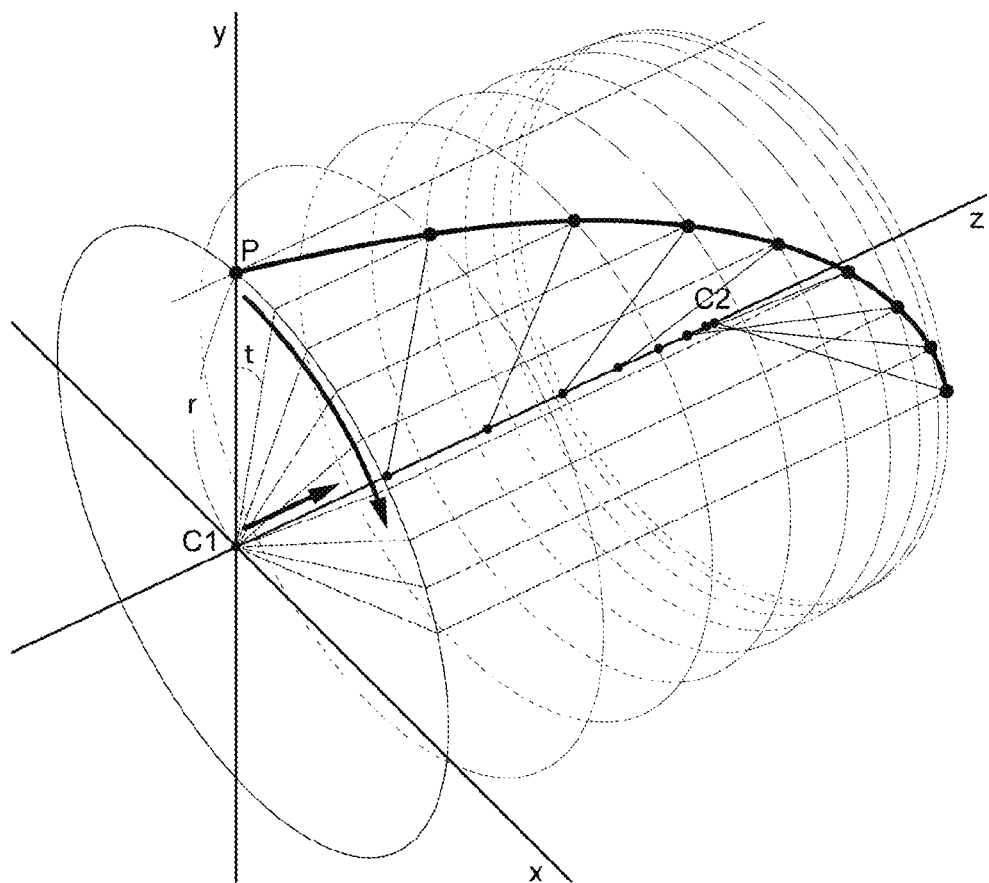
FIG. 6 is a schematic diagram of a three-dimensional cycloidal curve.

Referring to FIG. 6, a function of a circle of radius r centered on an origin C1 on a X-Y coordinate and rotated with a rotation angle of t each time is a shown in following [Equation 4] and [Equation 5].

$$x = r \times \cos(t) \quad \text{[Equation 4]}$$

$$y = r \times \sin(t) \quad \text{[Equation 5]}$$

To derive the function of the three-dimensional cycloidal curve from the velocity function, the velocity function of the circle centered on the origin C1 and rotated with the rotation angle of t each time is assumed to be a z-axis. A center of the circle is moved from C1 to C2 on the z-axis and the circle is rotated with the rotation angle of t each time. On a surface of a cylinder with center at C1, radius equal to r and a height from C1 to C2, the locus of any point p on the circle forms the three-dimensional cycloidal curve whose function is as shown in following [Equation 6] to [Equation 8].

$$x = r \times \cos(t) \quad \text{[Equation 6]}$$

$$y = r \times \sin(t) \quad \text{[Equation 7]}$$

$$z = \frac{\sin(t)}{1 - \cos(t)} \quad \text{[Equation 8]}$$

Figure 7:
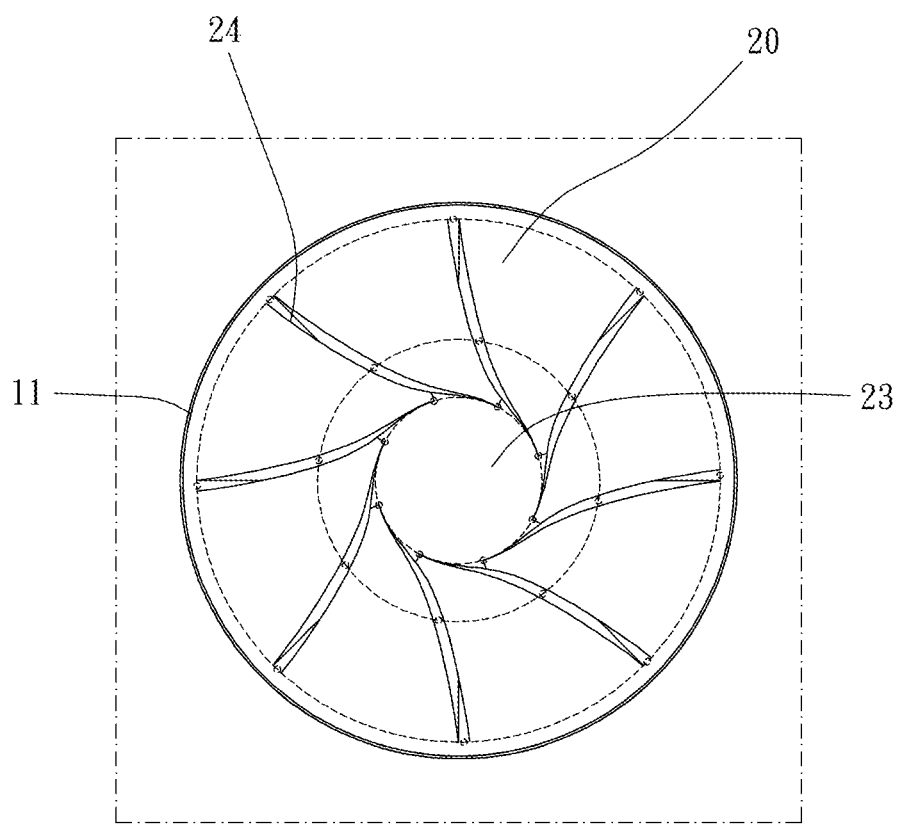
FIG. 7 is a partial enlargement of a preferable embodiment of the present invention.
Figure 8:
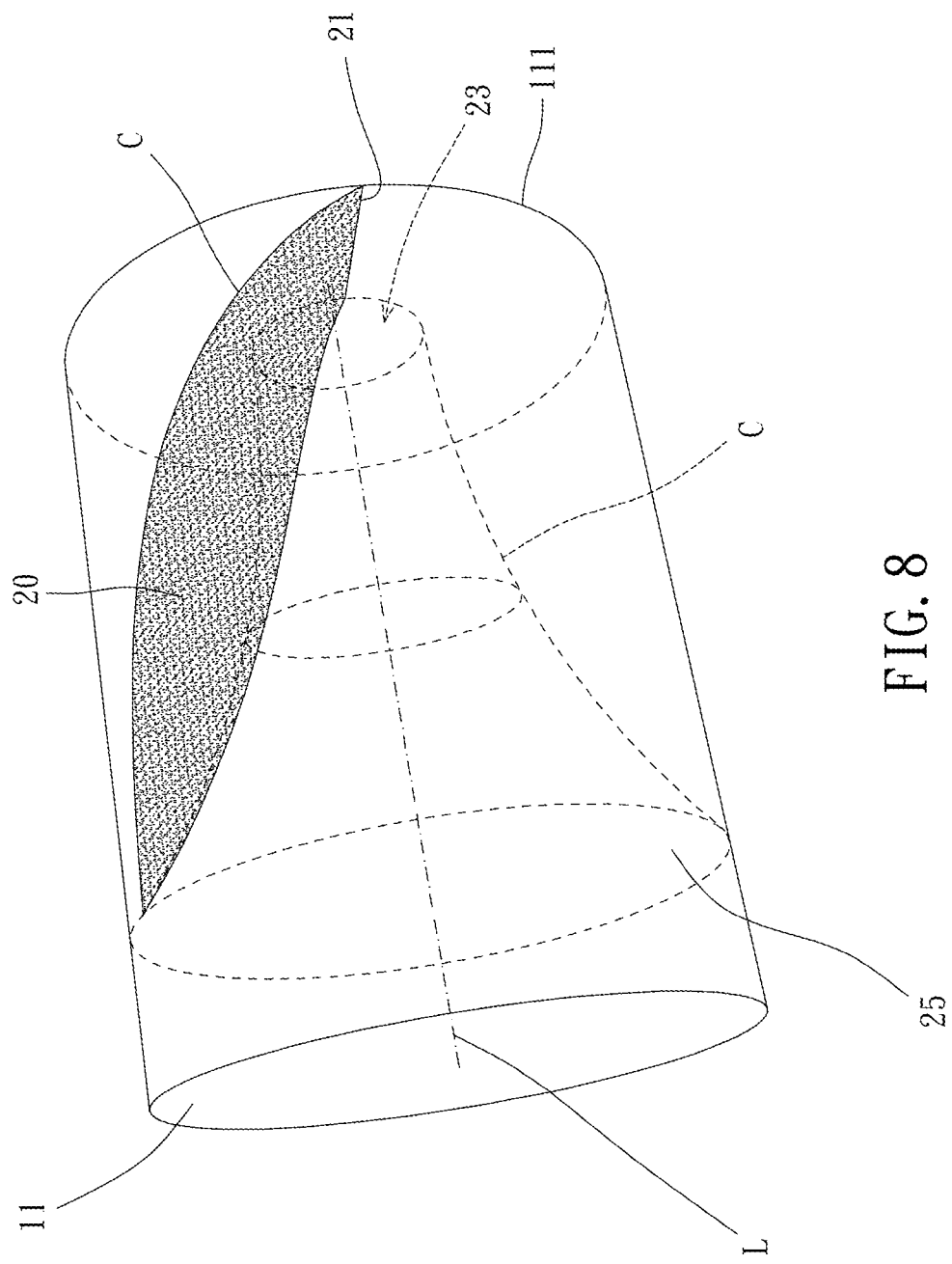
FIG. 8 is a schematic diagram of an inlet passage having a flared channel of a preferable embodiment of the present invention.

The three-dimensional cycloidal curve is applied to the plurality of blades 20, and a distance between an extension 22 of a cycloidal curve C of respective one of the plurality of blades 20 and a surface of the first tapering portion 31 is smaller than or equal to 5 mm. For example, the extension 22 of the cycloidal curve C and the surface of the first tapering portion 31 are tangent to each other so that the particle-containing gas can be swirled along the surface of the first tapering portion 31 so as to reduce the kinetic energy loss caused by friction. Relative to the extension direction L, points of respective one of the plurality of blades 20 nearmost to the extension direction L define a circle 23, and a diametric dimension of the circle 23 is 0.15 to 0.5 times a diametric dimension of the inlet passage 11 so as to provide preferable swirling effect and high flow rate. Refer to FIGS. 7 and 8, inner edges 24 of respective one of the plurality of blades 20 around the extension direction L define a flared channel 25 tapered in a direction toward the first tapering portion 31, and any cross-section of the flared channel 25, taken along a plane containing the extension direction L, has a cycloidal profile. Therefore, the particle-containing gas is introduced into the inlet passage 11 and flows through the plurality of blades 20 along paths with shortest retention time so as to reduce the kinetic energy loss caused by friction. The centrifugal filtration device 1 has preferable filtration effect and can reduce power required to deliver the particle-containing gas to the centrifugal filtration device 1.

With the structures described above, When the particle-containing gas is introduced into the inlet passage 11, the plurality of blades 20 guide the particle-containing gas to be swirled around the extension direction L. The particles are swirled outward along the direction of inertia because of larger centrifugal force and discharged through the particle collection passage 14. The gas is swirled at an inner region of the swirly flow and flows along the guiding mechanism 30 to the outlet passage 12 because of Coanda effect, so as to shorten a flow distance of the gas and reach filtration effect. As a result, the centrifugal filtration device 1 has low kinetic energy loss, small volume, easy movement and assembly/disassembly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A centrifugal filtration device, including:
    a casing, including an inlet passage and an outlet passage which are arranged along an extension direction;
    a plurality of blades, relative to the extension direction, extending spirally on an inner circumferential wall of the inlet passage;
    a guiding mechanism, including a first tapering portion tapered in a direction toward the inlet passage, disposed in the casing and located between the plurality of blades and the outlet passage;
    wherein each of the plurality of blades spirally extends along a cycloidal curve.

2. The centrifugal filtration device of claim 1, wherein the guiding mechanism further includes a second tapering portion tapered in a direction toward the outlet passage, as viewed in a radial direction perpendicular to the extension direction, the first tapering portion is non-overlapped with the inlet passage and the second tapering portion is non-overlapped with the outlet passage.

3. The centrifugal filtration device of claim 2, wherein the guiding mechanism is formed as an oval structure and includes a sharp end and a blunt end which are disposed opposite to each other, the first tapering portion is the sharp end, and the second tapering portion is the blunt end.

4. The centrifugal filtration device of claim 1, wherein the casing further includes a cylinder portion arranged on the extension direction and a particle collection passage transversely connected to the cylinder portion, the particle collection passage is located radially out of the outlet passage, and the particle collection passage at least partially protrudes beyond the cylinder portion toward the extension direction as viewed in an axial direction of the particle collection passage.

5. The centrifugal filtration device of claim 4, wherein the casing further includes a guiding portion which is obliquely connected between the cylinder portion and the particle collection passage and radially expands outwardly in a direction away from the outlet passage, and the guiding portion is located out of the cylinder portion as viewed in the axial direction of the particle collection passage.

6. The centrifugal filtration device of claim 1, wherein a distance between an extension of the cycloidal curve of respective one of the plurality of blades and a surface of the first tapering portion is smaller than or equal to 5 mm.

7. The centrifugal filtration device of claim 1, wherein relative to the extension direction, points of respective ones of the plurality of blades nearmost to the extension direction define a circle, and a diametric dimension of the circle is 0.15 to 0.5 times a diametric dimension of the inlet passage.

8. The centrifugal filtration device of claim 1, wherein inner edges of respective ones of the plurality of blades around the extension direction define a flared channel tapered in a direction toward the first tapering portion, and any cross-section of the flared channel, taken along a plane containing the extension direction, has a cycloidal profile.

9. A centrifugal filtration device, including:
    a casing, including an inlet passage and an outlet passage which are arranged along an extension direction;
    a plurality of blades, relative to the extension direction, extending spirally on an inner circumferential wall of the inlet passage;
    a guiding mechanism, including a first tapering portion tapered in a direction toward the inlet passage, disposed in the casing and located between the plurality of blades and the outlet passage;
    wherein the casing further includes a cylinder portion arranged on the extension direction and a particle collection passage transversely connected to the cylinder portion, the particle collection passage is located radially out of the outlet passage, and the particle collection passage at least partially protrudes beyond the cylinder portion toward the extension direction as viewed in an axial direction of the particle collection passage;
    wherein the casing further includes a guiding portion which is obliquely connected between the cylinder portion and the particle collection passage and radially expands outwardly in a direction away from the outlet passage, and the guiding portion is located out of the cylinder portion as viewed in the axial direction of the particle collection passage;
    wherein the guiding mechanism further includes a second tapering portion tapered in a direction toward the outlet passage, as viewed in a radial direction perpendicular to the extension direction, the first tapering portion is non-overlapped with the inlet passage and the second tapering portion is non-overlapped with the outlet passage; the guiding mechanism is formed as an oval structure and includes a sharp end and a blunt end which are disposed opposite to each other, the first tapering portion is the sharp end, and the second tapering portion is the blunt end; a ratio of a major axis to a minor axis of the oval structure is between 1.1 and 1.5; the outlet passage includes a tubular member connected to the cylinder portion and a blocking flange disposed circumferentially around the tubular member, and at least part of the blocking flange is located within the particle collection passage as viewed in the axial direction of the particle collection passage; the blocking flange is gradually radially broadened in a direction toward the outlet passage and includes an annular groove open toward the outlet passage; a ratio of an inner diameter of the cylinder portion to a radial dimension of the outlet passage is between 1.5 and 2.5; the casing further includes a broadened portion which is connected between the inlet passage and the cylinder portion and is gradually broadened in a direction from the inlet passage toward the outlet passage, a maximum diameter portion is defined between the first tapering portion and the second tapering portion, the maximum diameter portion is located in the cylinder portion and adjacent to a junction of the cylinder portion with the broadened portion; the guiding mechanism is connected to the outlet passage by at least one supporting member; each of the plurality of blades has a side which is adjacent to the first tapering portion and has an end surface flush with an end opening of the inlet passage; a distance between the end opening of the inlet passage and the first tapering portion is between 10 mm and 30 mm.

\* \* \* \* \*